No. 811,936. PATENTED FEB. 6, 1906.
A. R. LE MOON.
APPARATUS FOR APPLYING TIRES TO WHEELS.
APPLICATION FILED NOV. 25, 1903.

3 SHEETS—SHEET 1.

Witnesses:
M. J. McSpike
Robert H. Weir

Inventor
Axel R. Le Moon
By Brown & Darby
Attys

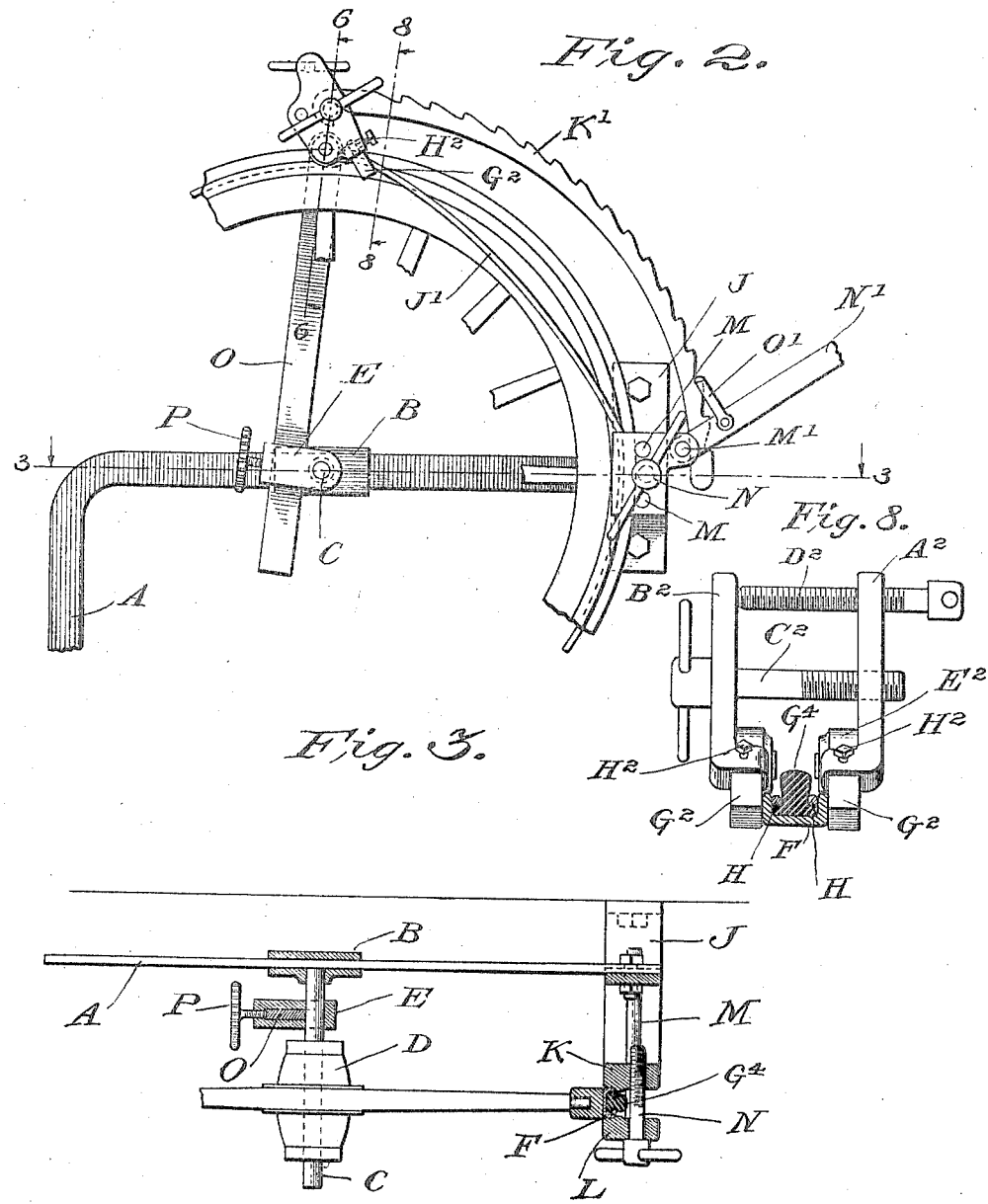

No. 811,936. PATENTED FEB. 6, 1906.
A. R. LE MOON.
APPARATUS FOR APPLYING TIRES TO WHEELS.
APPLICATION FILED NOV. 25, 1903.

3 SHEETS—SHEET 3.

Witnesses:
M. J. McPike
Robert H. Weir

Inventor
Axel R. Le Moon
By Mowers & Darby
Attys

UNITED STATES PATENT OFFICE.

AXEL R. LE MOON, OF CHICAGO, ILLINOIS, ASSIGNOR TO NELSON & LE MOON, OF CHICAGO, ILLINOIS, A COPARTNERSHIP.

APPARATUS FOR APPLYING TIRES TO WHEELS.

No. 811,936.  Specification of Letters Patent.  Patented Feb. 6, 1906.

Application filed November 25, 1903. Serial No. 182,650.

*To all whom it may concern:*

Be it known that I, AXEL R. LE MOON, a citizen of the United States, residing at Chicago, in the county of Cook and State of Illinois, have invented a new and useful Apparatus for Applying Tires to Wheels, of which the following is a specification.

This invention relates to apparatus for applying tires to wheels.

The object of the invention is to provide an apparatus which is simple in construction and efficient in operation for applying rubber tires to wheels.

A further object of the invention is to provide an apparatus which is simple and efficient for applying the side wires which hold rubber tires to the wheel-channel.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Figure 1:
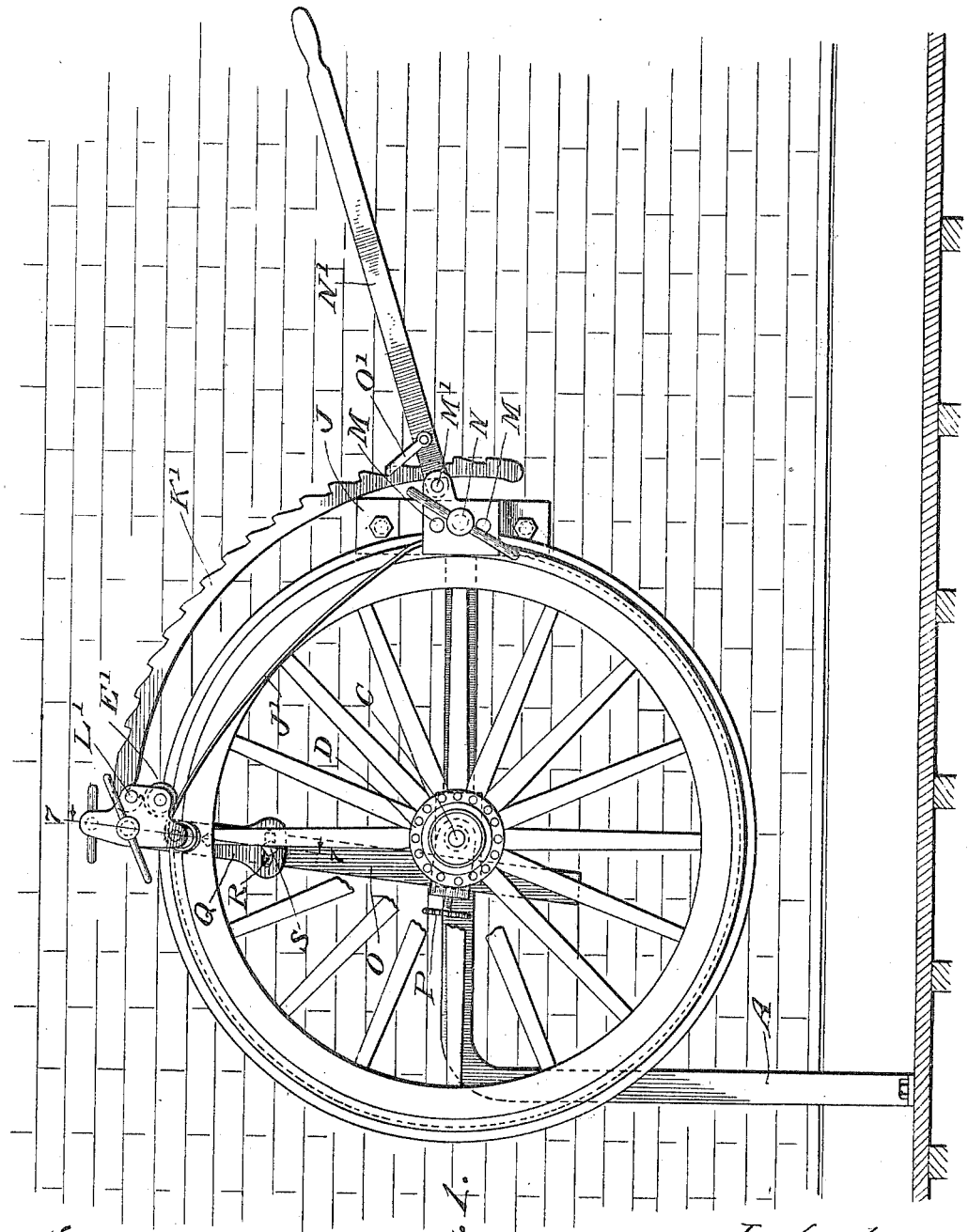
Figure 4:
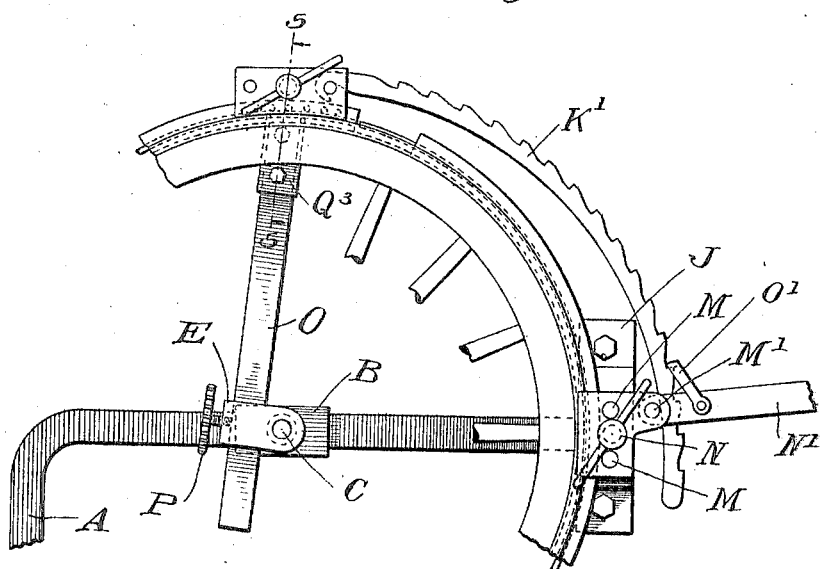
Figure 5:
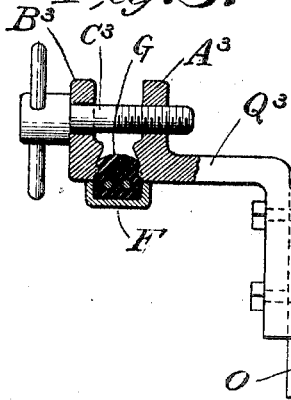
Figure 6:
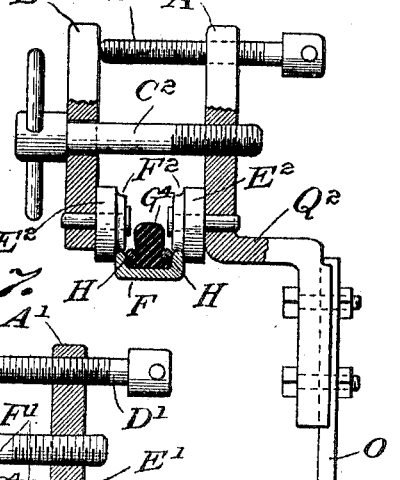
Figure 7:
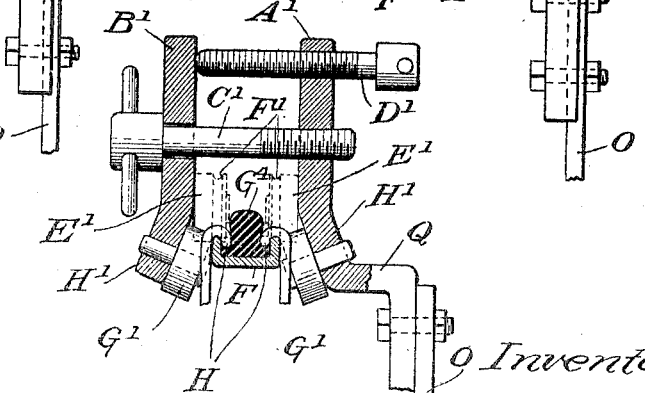

Referring to the accompanying drawings, and to the various views and reference-signs appearing thereon, Figure 1 is a view in side elevation of a tire-applying device embodying the principles of my invention and showing the arrangement of the same in applying the side wires to the rubber tire to hold the same in the wheel-channel. Fig. 2 is a view similar to Fig. 1, parts broken out, showing a modified construction embraced within the spirit and scope of my invention. Fig. 3 is a broken view in section on the line 3 3 of Fig. 2 looking in the direction of the arrows. Fig. 4 is a view similar to Figs. 1 and 2, parts broken off, showing a construction and arrangement embraced within the spirit and scope of my invention for drawing the ends of the rubber tire together. Fig. 5 is a broken detail view in section on the line 5 5, Fig. 4, looking in the direction of the arrows. Fig. 6 is a similar view on the line 6 6, Fig. 2, looking in the direction of the arrows. Fig. 7 is a view similar to Figs. 5 and 6, taken on the line 7 7, Fig. 1, looking in the direction of the arrows. Fig. 8 is a view similar to Figs. 5, 6, and 7, taken on the line 8 8, Fig. 2, looking in the direction of the arrows.

The same part is designated by the same reference-sign wherever it occurs throughout the several views.

In the application of rubber tires to wheels it is customary to employ binding-wires for the purpose of efficiently binding or holding the rubber tire to the channel formed in the felly of the wheel. These binding-wires have ordinarily been applied in two ways—namely, as inside wires—that is, the wires pass longitudinally through the rubber tire, as indicated, for instance, in Fig. 5, and in the other case these binding-wires are applied as outside wires—namely, to shoulders formed on the sides of the tire and inside of the flanges of the channel—as seen, for instance, in Figs. 6, 7, and 8. In the application of tires to wheels wherein inside wires are employed it is usually necessary to leave a space of more or less extent between the ends of the tire in order to afford access to the inside binding-wires to braze the same, and consequently before the operation is completed it is necessary to draw the ends of the rubber tire together, so as to close the gap therebetween left in the operation of applying the wires. Again, where outside binding-wires are employed for clamping or holding the tire to the channel of the wheel it is customary to arrange the tire in place in the channel and then to braze or otherwise secure together the ends of a sufficient length of wire to form the binding-wire. In order that the binding-wire in such case may efficiently perform its function of clamping or binding the tire to the channel, it is necessary that the diameter of the ring formed by the brazing or otherwise securing together of the ends of the proper length of wire be slightly less than the diameter of the flange of the channel in which the tire and its binding-wire are to be received. This renders the application of the wire to the tire when placed in the channel too difficult to be accomplished by hand, inasmuch as the wire is first partially placed in position and in encircling relation with respect to the channel and inside of the channel-flange, thereby leaving a portion of the wire oustide of such flange, as clearly indicated in Figs. 1 and 2, and it is among the special purposes of my present invention to provide means for completing the application of this portion of the binding-wire to the tire and to force the same over the edge of the flange of the channel into its seat inside of such flange and upon the lateral shoulder formed on the tire. In accomplishing this work mechanically and in accordance with the principles of my invention I propose to employ means for rigidly clamping and holding the wheel against rotation, while a suitable device, power-actuated and arranged to engage underneath the unapplied portion of the wire, is caused to traverse the periphery of the wheel a sufficient distance to wedge or force the unapplied portion of the wire over the edge of the flange into its seat. It is also among the purposes of my invention to provide means which are power-actuated for drawing the ends of a tire together in the case where inside binding-wires are employed, as shown in Figs. 4 and 5.

Referring to the accompanying drawings, showing various constructions embodying the principles of my invention, reference-sign A designates a suitable supporting frame or bracket. Upon this supporting-bracket is mounted to slide a block B, carrying a pin or stud C, arranged to extend through the hub D of a wheel to form a support therefor. Loosely mounted to rock upon or with stud C is a block E, in which is mounted a power-actuated device which travels peripherally along the wheel to draw the ends of the tire together in the one case or to force the binding-wire into its seat, as will be more fully hereinafter set forth.

F designates the wheel-channel to which the tire is to be applied, and the tire may be either of the inside binding-wire type, as indicated at G, Fig. 5, or of the outside binding-wire type G', as shown in Figs. 3, 6, 7, and 8.

H designates the outside binding-wires. A bracket J, suitably attached to a wall or other convenient support, is provided and forms a means for supporting the horizontal arm portion of bracket or frame A, on which the slide-block B is mounted. This supporting-bracket J carries clamping-jaws K L, (see Fig. 3,) one or both of which may be movable upon guide-rods M and which clamping-jaws may be clamped together by a screw-rod N or otherwise, as may be convenient, so as to clamp the felly and channel of the wheel therebetween, as shown most clearly in Fig. 3, in order to hold the wheel rigidly against rotative movement during the operation of the binding-wire-applying device and of the device through which the ends of the tire are drawn together, as above explained.

I will first describe the device as employed for applying the binding-wire and forcing the same into its proper seat, particular reference being had to Figs. 1, 2, 3, 6, 7, and 8. I have before referred to the fact that upon the rod C, which supports the hub of the wheel, is pivotally mounted a block E. This block is provided with an opening therethrough in which is adjustably mounted an arm or bar O, said bar being held in adjusted position in said block by means of a hand-screw P or otherwise, as may be convenient. In the form of construction shown in Figs. 1 and 7 a bracket Q is pivotally mounted upon the end of arm O, the end of bracket Q being provided with a curved elongated slot R, (see Fig. 1,) through which and arm O passes a clamp-screw S, whereby bracket Q may be rocked or tilted relative to arm O. The outer end A' of bracket Q constitutes a clamping-jaw, with which coöperates a jaw B', said jaws being separable with respect to each other and held in any desired relative position by means of the clamp-screws C' D', respectively, passing through said jaws B' A'. For instance, the screw C' passes loosely through jaw B' and is threaded into a seat or opening formed in jaw A', thereby serving to draw said jaws together or to separate the same, while clamp-screw D' is tapped through jaw A' and bears against jaw B', thereby, in effect, forming a clamp-screw in conjunction with adjusting-screw C' to clamp or hold the jaws A' B' in relative position. Each of the jaws A' B' carries a roller E', each being peripherally grooved, as at F', and adapted to receive in such peripheral grooves the upper edges of the side flanges of the channel F. The lower ends of the jaws A' B' in the form shown in Figs. 1 and 7 are arranged to flare outwardly or away from each other, and mounted upon or carried by such outwardly-flared portions are guide-rollers G'. By reason of the outwardly-inclined or flaring portions H' of the jaws A' B' it will be observed that the peripheries of guide-rollers G' are inclined with respect to the plane of the sides of the flanges of the wheel-channel.

In the operation of the device so far described the wheel-hub D is placed in position upon the supporting pin or stud C. The arm O is adjusted through the opening in the block E, so as to permit the guide-rollers E' of the device carried at the end of arm O to rest upon the edges of the side flanges of the channel F, and in this position the arm O is clamped in the block E by clamp-screw P or otherwise, as will be apparent. Before this is done, however, the tire is applied to the channel of the wheel and the side binding-wires H are partially applied or inserted by hand or otherwise as far around the periphery of the wheel as possible, leaving only a portion thereof, as indicated at J', Figs. 1 and 2, to be applied. The clamp-jaws K L are then clamped together, so as to rigidly hold the wheel against rotative movement upon its supporting-stud C and at such a point as to bring the unapplied portion J' of the binding-wires between the point where the wheel is clamped and the point where the jaws A'

B' engage the periphery of the wheel, so that the inclined peripheral surfaces of rollers G' engage underneath the unapplied portions J' of the side wires, as clearly shown in Fig. 1. Of course it will be obvious that it is necessary or desirable that the edge of the rollers G' next adjacent the flanges of channel F be substantially flush with the outer edges of such flanges. Therefore, by adjustably rocking arm Q upon and with reference to arm O in one direction or the other, as may be necessary, the inner edges of the rollers G' may be brought to a point substantially flush with the outer edges of such flanges. When this adjustment is effected, the arm Q is clamped in adjusted position, and it only remains to rock the arm O in a direction to cause the rollers G' to travel or move peripherally along the wheel and toward the point where the wheel is clamped between the jaws K and L. This travel of the guide-rollers G' or of the supporting-jaws A' B' may be effected in any suitable or convenient manner. It will be observed that the supporting-arm O is supported or hinged about an axis concentric with the supporting-stud C, upon which the wheel is mounted, and therefore concentric with the axis of such hub. Therefore by rocking supporting-arm O the desired travel of the wire-deflecting rollers G' is accomplished. Any suitable power-actuated mechanism for accomplishing the swinging movement of arm O may be employed, and while I have shown and will now describe a simple arrangement for accomplishing the desired object I desire it to be understood that this feature forms in the specific details thereof no part of my present invention and may be altered or varied as desired. In the particular form shown I employ a curved rack-bar K', having a hooked end arranged to engage a stud or pin L', (see Fig. 1,) or it may be arranged to engage the clamp-rod C'. (See Fig. 2.)

Pivotally mounted at one end upon a stud or bolt M' of the clamp K L is a hand-lever N', carrying a pawl O', arranged to coöperate with the teeth of rack-bar K'. From this construction it will be seen that I provide a ratchet arrangement operated by lever N' and by which arm O may be rocked about the axis of stud or pin C, thereby drawing the deflecting-rollers G' peripherally along the wheel toward the point where the wheel is clamped between the jaws K L, and hence forcing the side wires over the outer edges of the flanges of the channel and into their seats within said flanges and upon the shoulders formed on the sides of the tire. I regard it a valuable and important feature of my invention to thus rigidly clamp or hold the wheel and to draw the wire-applying device peripherally along the wheel in the work of forcing the side wires into their proper places within the flanges of the channel, for the reason that thereby the side wires may be applied by hand throughout the greater portion of the peripheral surface of the wheel, leaving only a small portion (indicated at J') unapplied, and consequently a comparatively short travel of the wire-applying device peripherally along the wheel is all that is necessary to complete the application of the side wires to the wheel, thus enabling me to apply the wires quickly while imposing the least possible strain upon the wheel and without the necessity of special care or attention to hold or maintain in their seats or proper positions those portions of the binding-wires which have been applied by hand.

In Figs. 2, 6, and 8 I have shown a slightly-modified form, wherein the jaws $A^2 B^2$, the clamping-screws $D^2 C^2$, and guide-rollers $E^2$, with their peripheral grooves $F^2$, are similar in all respects to the construction shown in Figs. 1 and 7 and above described. Instead, however, of outwardly flaring the jaws $A^2 B^2$, as in the case of jaws A' B', and mounting rollers G' upon such inclined or outwardly-flaring portions, so as to incline the peripheral surfaces of such rollers relative to the planes or sides of the flanges of the channel, as in the construction shown in Figs. 1 and 7, I employ in lieu of such rollers deflecting-blocks $G^2$, said blocks being adjustably mounted or otherwise suitably clamped by set-screws $H^2$ or otherwise upon the jaws $A^2 B^2$, said deflecting-blocks being arranged to extend against the sides of the flanges of the channel F and in position to engage underneath the unapplied portion J' of the side wires, as clearly shown. In this construction it is obvious that inasmuch as the sides of the deflecting-blocks $G^2$ extend above the top edges of the flanges of the channel the rocking adjustment of the jaws $A^2 B^2$ upon their supporting-arm O is unnecessary. Therefore the arm $Q^2$ is not pivotally mounted upon arm O, but is rigidly clamped thereto. In other respects the operation remains the same as above described.

In case inside wires are employed, as in Figs. 4 and 5, instead of forcing the wires over the edges of the flanges of the channel, as in the instances above described, it is only necessary to employ the device to draw the ends of the tire together after the application of the tire and its binding-wires to the channel. In this device an arm or bracket $Q^3$ is bolted to the end of arm O, and said bracket is arranged to form one jaw $A^3$ of a clamp, a coöperating jaw $B^3$ being associated therewith and movable toward the same in any convenient manner—as, for instance, by means of a clamp-screw $C^3$, so as to clamp the tire therebetween, as clearly shown in Figs. 4 and 5. In other respects the operation is the same as that above described, the clamp-jaws $A^3 B^3$ when clamped together upon the tire being caused to travel peripherally along the wheel by the rocking of arm O, while the wheel is rigidly or securely held, thereby drawing the ends of the tire together.

From the foregoing description it will be seen that I provide an exceedingly simple and efficient construction, economical in manufacture, and by means of which tires may be quickly applied to wheels and wherein the side wires in certain classes of tires— that is, tires employing side binding-wires— are efficiently and expeditiously applied. It will also be seen that in either case the wheel is rigidly held against rotative movement while the tire or wire applying devices are in operation, and consequently it is necessary to operate over only a limited extent of the periphery of the wheel, and hence enabling the work to be accomplished rapidly and without imposing any undue strain upon the wheel itself. Any strain in the operation of applying the side wires is in the direction of the length of the spokes rather than in a direction transverse to the length of the spokes in the case where the wheel is itself rotated.

Having now set forth the object and nature of my invention and various constructions embodying the principles thereof, I desire it to be understood that many variations and changes in the details of construction and arrangement of parts would readily occur to persons skilled in the art and still fall within the spirit and scope of my invention. I do not desire, therefore, to be limited or restricted to the exact and specific details shown and described; but

What I claim as new and useful and of my own invention, and desire to secure by Letters Patent, is—

1. In a tire-applying device, a wheel-support, means for clamping the wheel against rotary movement upon its rotary support, an arm pivotally mounted concentric with the wheel-support, a bracket carried by said arm and including jaws, deflecting-rollers carried by said jaws and arranged to engage underneath the unapplied portions of the tire-binding wires, said bracket being pivotally mounted upon said arm for rocking adjustment relative thereto, means for clamping said bracket in adjusted position, whereby the peripheral surfaces of said rollers may be brought substantially flush with the edges of the flanges of the wheel-channel, and means for rocking said arm, as and for the purpose set forth.

2. In a tire-applying device, a supporting-frame, a stud carried thereby and arranged to extend through the hub of a wheel to support the same, means for clamping the wheel against rotary movement upon said stud, an arm pivotally mounted upon said stud, a bracket pivotally mounted upon said arm for rocking adjustment relative thereto and including jaws, means for clamping said bracket in adjusted position, means for moving said jaws toward and from each other, guide-rollers carried by said jaws and arranged to rest upon the edges of the flanges of the wheel-channel, deflecting-rollers also mounted upon said jaws and in inclined relation with respect to the planes of said flanges, said deflecting-rollers being arranged to engage underneath the unapplied portions of the tire-binding wires, and means for rocking said arm, as and for the purpose set forth.

In witness whereof I have hereunto set my hand, this 20th day of November, 1903, in the presence of the subscribing witnesses.

AXEL R. LE MOON.

Witnesses:
CHAS. H. SEEM,
S. E. DARBY.